P. FISCHER.
INCLINATION INDICATOR.
APPLICATION FILED AUG. 15, 1917.
1,314,258.
Patented Aug. 26, 1919.
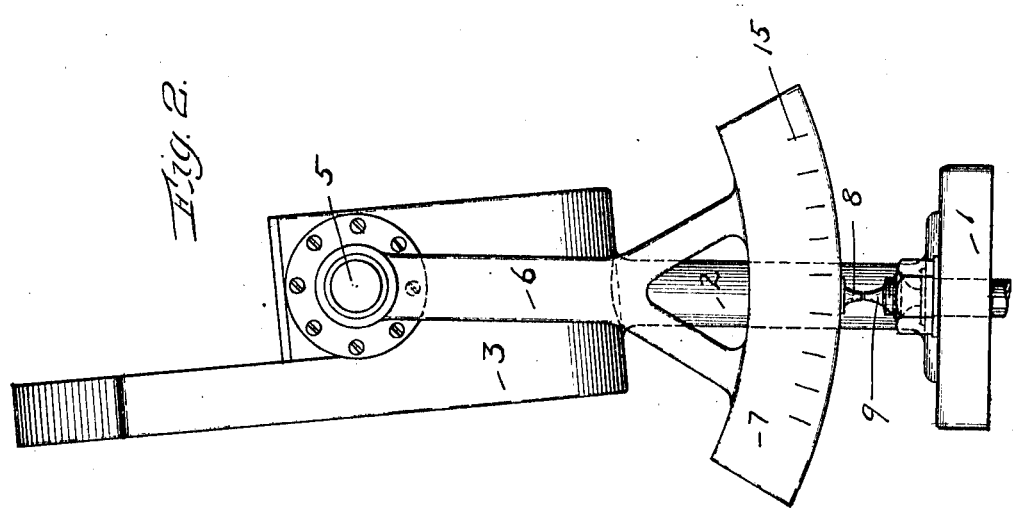
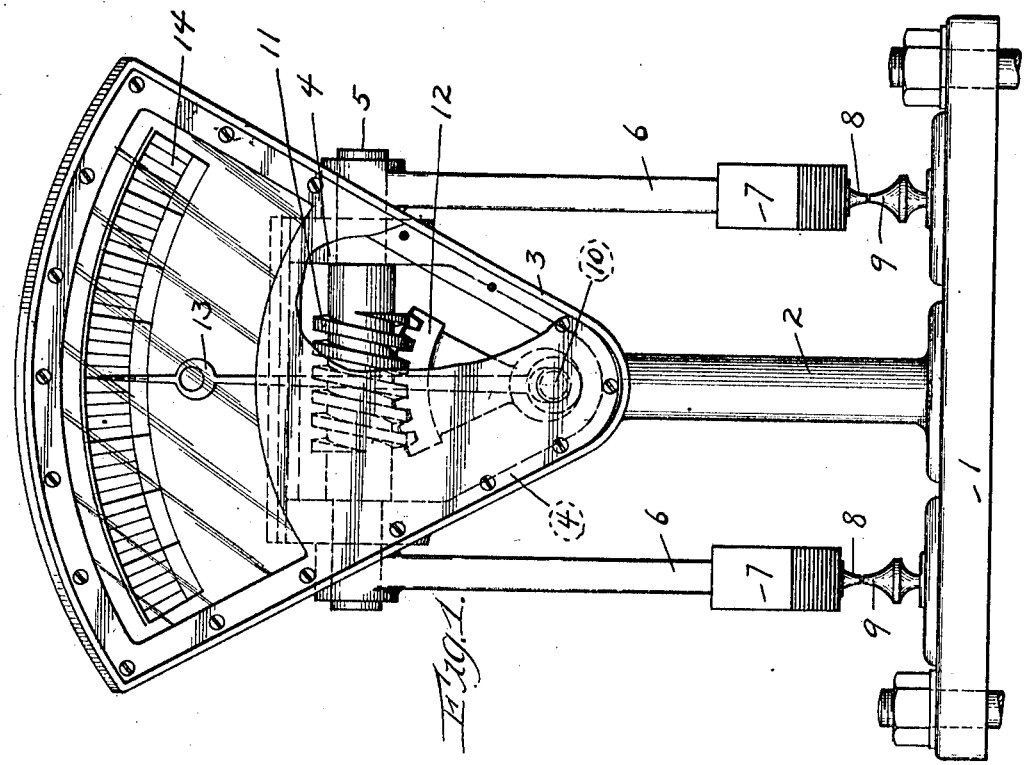
Witness:
R. L. Farrington
Inventor:
Paolo Fischer
by Albert Scheibli,
Attorney

UNITED STATES PATENT OFFICE.

PAOLO FISCHER, OF CHICAGO, ILLINOIS.

INCLINATION-INDICATOR.

1,314,258.  Specification of Letters Patent.  Patented Aug. 26, 1919.

Application filed August 15, 1917. Serial No. 186,273.

*To all whom it may concern:*

Be it known that I, PAOLO FISCHER, a citizen of Italy, residing at Chicago, Illinois, have invented certain new and useful Improvements in Inclination-Indicators; and I do hereby declare the following to be a full, clear, and exact description of the invention, such as will enable others skilled in the art to which it appertains to make and use the same.

My invention relates to leveling instruments or inclination indicators, its general aims being to provide an instrument of this class which will afford dependable indications visible from a long distance and adapted to be read by observers at points at right angles to the axis about which the tilting or leveling is effected. For this purpose, my invention particularly aims to fill a need long felt in certain classes of industrial work where an exactness of leveling, or a correspondingly exact control of the amount of tilting, is of high importance, but where the levels or inclination indicators in common use cannot be read to advantage from the vantage points at which the operators are desirably stationed. For example, in operating electric furnaces of a number of different types, it is important that the furnace should normally be so disposed as to present the surface of the bath along a given plane (or parallel to a given plane) with respect to the furnace proper; and it is likewise important that in tilting the furnace for pouring out the molten charge, the extent of the tilting should be accurately controlled. However, for the most effective operation of the furnace, the operator must desirably be positioned either at the front or the rear of the latter. Consequently, he could not readily view an ordinary spirit level directly from his position, nor could he view this dependably by reflection in a mirror, as the heat generated within the furnace would not permit the use of such mirrors. To meet this need, I have designed the inclinometer shown in the appended drawing, thereby aiming also to acccomplish the further objects which will appear from the following specification.

In the drawing, Figure 1 is a front elevation of one embodiment of my invention, with a portion of the front of the casing broken away to show the transmission mechanism in the interior. Fig. 2 is a side elevation of the same embodiment.

In the indicator or inclinometer of the drawings, the base plate 1 carries a pillar 2 supporting a casing 3, which casing houses a fork 4 affording pivotal bearings for a shaft 5. Fast upon the opposite ends of the shaft 5 are pendulums 6 each carrying a weight 7 and an indicating tip 8. Each of these tips 8 desirably swings over a pointed knob 9 mounted on the base plate 1, the pendulums being so disposed with respect to the shaft that the tips 8 and the points of the knobs 9 will aline when the base plate 1 is level, thereby affording an indication of the leveling which may be seen by operators standing at either the right or the left of the instrument, or in other words viewing the same as in Fig. 2. To make the indications visible also from a relatively transverse direction, or that in which Fig. 1 is taken, I also mount in the casing 3 a shaft 10 disposed at right angles to the shaft 5, and connect the two shafts by suitable transmission means, such as a worm 11 on the shaft 5 and a gear segment 12 on the shaft 10. Then I mount on the shaft 10 a pointer or neeedle 13 swinging over a graduated scale 14 and thereby indicating the inclination of the base plate 1.

With the instrument, as described, placed on the top of a tiltable furnace, it will be obvious that the weighted pendulums 6 will tend to remain vertical at all times, so that a tilting of the base plate will cause a rotation of the shaft 5 with respect to the casing 3 and the parts mounted therein. This rotational movement will be transmitted by the worm and gear to the transverse shaft 10, so as to partially rotate the latter and hence move the indicating needle 13 with respect to its scale. It will be obvious that by suitably lengthening the pointer 13 and correspondingly locating the scale 14, I can easily construct an inclinometer which may be read with the naked eye from a considerable distance. Also, that by using a worm and gear transmission instead of bevel gearing, I can avoid backlash and hence obtain the unusual steadiness which is essential if accurate readings are to be taken without the delay often involved in waiting for a needle to come to rest. For this same reason, the instrument of my invention is also adapted for much more speedy readings than could be obtained from an inclinometer of the type having a liquid adapted to change in level within two relatively connected vertical tubes. Moreover, by using a pendulum at each end of the main shaft, I avoid a torsion of this shaft, which might otherwise interfere with the accuracy and quickness of the indications. Where the manipulation of the furnace is such that the attendant also is sometimes stationed at other points, the main scale may be supplemented by an auxiliary scale 15 carried by the pendulum, as shown for example on the weight 7 of Fig. 2. In any case, it will be obvious that my construction lends itself to the use of relatively massive and durable parts, thereby readily withstanding such shocks as may be transmitted to the instrument when the furnace is charged or discharged; also, that the parts can easily be built so as to be unaffected by such furnace heat as may be conducted or radiated to the same.

However, while I have described the instrument of my invention as applied to electric furnace work and as employing an auxiliary scale on the weight of the pendulum, I do not wish to be limited to this particular use of my device, nor to particular details of the construction or arrangement herein disclosed, it being obvious that the same might be varied in many ways without departing from the spirit of my invention.

I claim as my invention:

1. In an inclination indicator, a support, two relatively transverse shafts pivoted thereon, two visual indicating means associated respectively with the two shafts, a pair of pendulous bodies fast respectively upon the ends of one shaft, a worm fast upon the last named shaft and between said bodies, and a gear segment meshing with said worm and fast upon the other shaft.

2. In an inclinometer, a base plate, a support fast thereon, two relatively transverse shafts pivoted on the support and both extending parallel to the base plate but not in a common plane, a pendulous body fast on one shaft, coöperating visual indicating means carried by the other shaft and the support, transmission means connecting the two shafts, and coöperating visual indicating means carried by the base plate and by the shaft upon which the pendulous body is fastened.

Signed at Chicago, August 11th, 1917.

PAOLO FISCHER.

Copies of this patent may be obtained for five cents each, by addressing the "Commissioner of Patents, Washington, D. C."